United States Patent
You et al.

(10) Patent No.: US 11,787,893 B1
(45) Date of Patent: Oct. 17, 2023

(54) POLYASPARTIC ACID DERIVATIVE AND PREPARATION METHOD AND USE THEREOF AS LUBRICANT, AND WATER-BASED DRILLING FLUID AND USE THEREOF

(71) Applicants: Yangtze University, Hubei (CN); Jingzhou Jiahua Technology Co., Ltd., Hubei (CN)

(72) Inventors: Fuchang You, Jingzhou (CN); Mingbiao Xu, Jingzhou (CN); Kai Jiao, Jingzhou (CN); Shusheng Zhou, Jingzhou (CN)

(73) Assignees: Yangtze University, Jingzhou (CN); Jingzhou Jiahua Technology Co., Ltd., Jingzhou (CN)

( * ) Notice: Subject to any disclaimer, the term of this patent is extended or adjusted under 35 U.S.C. 154(b) by 0 days.

(21) Appl. No.: 18/111,933

(22) Filed: Feb. 21, 2023

(30) Foreign Application Priority Data

Sep. 9, 2022 (CN) .......................... 202211101124.X

(51) Int. Cl.
    *C08G 18/34* (2006.01)
    *C09K 8/04* (2006.01)
    *C10M 145/16* (2006.01)

(52) U.S. Cl.
    CPC .............. *C08G 18/341* (2013.01); *C09K 8/04* (2013.01); *C10M 145/16* (2013.01); *C09K 2208/34* (2013.01)

(58) Field of Classification Search
    None
    See application file for complete search history.

(56) References Cited

U.S. PATENT DOCUMENTS

| | | | | |
|---|---|---|---|---|
| 5,639,832 A | * | 6/1997 | Kroner | C08G 69/08 510/501 |
| 5,773,564 A | * | 6/1998 | Sikes | C08G 73/0611 528/363 |
| 2006/0155054 A1 | * | 7/2006 | Lenges | C08G 18/792 524/589 |
| 2011/0151113 A1 | * | 6/2011 | Wang | C08G 18/73 528/68 |
| 2017/0114265 A1 | * | 4/2017 | Ma | C09K 8/22 |
| 2019/0249065 A1 | * | 8/2019 | Singh | C09K 8/5756 |

* cited by examiner

*Primary Examiner* — Vishal V Vasisth
(74) *Attorney, Agent, or Firm* — Harness, Dickey & Pierce, P.L.C.

(57) ABSTRACT

Provided are a polyaspartic acid derivative and a preparation method and use thereof as a lubricant, and a water-based drilling fluid and use thereof. The polyaspartic acid derivative has a structure shown in formula I, wherein, in the formula I, $R^1$ is selected from the group consisting of —$CH_2$—$CH_2$—$CH_2$—, —$CH_2$—$CH_2$—$CH_2$—$CH_2$—, and —$CH_2$—$CH_2$—$CH_2$—$CH_2$—$CH_2$—$CH_2$—; $R^2$ is selected from the group consisting of —OH, —N—($CH_2$—$CH_2$—OH)$_2$, —O—$CH_2$—$CH_2$—NH—$CH_2$—$CH_2$—OH, —NH—$CH_2$—$CH_2$—OH, and —O—$CH_2$—$CH_2$—$NH_2$; and n and m are independently 8 to 17.

formula I

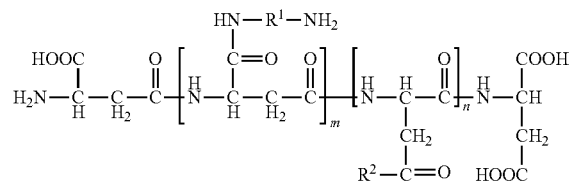

16 Claims, No Drawings

POLYASPARTIC ACID DERIVATIVE AND PREPARATION METHOD AND USE THEREOF AS LUBRICANT, AND WATER-BASED DRILLING FLUID AND USE THEREOF

CROSS REFERENCE TO RELATED APPLICATION

This patent application claims the benefit and priority of Chinese Patent Application No. 202211101124.X filed with the China National Intellectual Property Administration on Sep. 9, 2022, the disclosure of which is incorporated by reference herein in its entirety as part of the present application.

TECHNICAL FIELD

The present disclosure relates to the technical fields of petroleum drilling engineering and oilfield chemistry, and in particularly to a polyaspartic acid (PASP) derivative and a preparation method and use thereof as a lubricant, and a water-based drilling fluid and use thereof.

BACKGROUND

With the increasing energy consumption and the depletion of shallow oil and gas resources, in order to increase oil and gas production to meet energy consumption needs, during the process of oil and gas exploitation, the exploitation mode of oil and gas reservoirs has changed from conventional oil and gas wells to horizontal wells and extended-reach wells. In particular, for offshore oil and gas reservoirs in the deep sea, shallow sea, beach, and tidal zone, conventional oil and gas wells have high cost and low economic benefits due to the need for independent development and construction of platforms, while extended-reach wells, as one of the unconventional drilling technologies, have the advantages of high efficiency and low cost, making its development proportion for offshore oil and gas reservoirs increase annually. By the mode of the development of extended-reach wells, the connecting of oil and gas reservoirs in series can expand the seepage area of oil layers and increase the oil and gas productivity of single wells. Although the advantages of extended-reach wells are obvious, the biggest technical problems are large frictional torque and wellbore instability. The problem of high friction between the drilling with a long horizontal section and the casing or rock wall always restricts the maximum extension range of extended-reach wells.

For the above technical problems, oil-based drilling fluid is the first choice during the drilling process, but the drilling fluid has some problems, such as high cost, difficult cuttings disposal, and environmental pollution. For water-based drilling fluids, the problems in terms of frictional torque and wellbore stability are particularly prominent. Based on this, in order to solve the problems of high friction and wellbore instability in the horizontal section of extended-reach wells, it is necessary to develop an environmentally friendly treatment agent with excellent lubricating performance. The treatment agent takes into account the inhibition performance and plugging performance at the same time to overcome the problems existing in the water-based drilling fluid for extended-reach wells.

Chinese patent CN105038732B (with an application number of 201510362976.8) discloses a lubricating plugging agent for drilling fluids. The lubricating plugging agent can effectively reduce the lubricating coefficient and filtration volume of fresh water-based pulp and salt water-based pulp, having good plugging performance and lubricating performance. However, the lubricating plugging agent contains sulfonated groups in molecules, has certain biological toxicity, and is difficult to dispose of when discarded.

SUMMARY

The present disclosure is to provide a polyaspartic acid (PASP) derivative and a preparation method and use thereof as a lubricant, and a water-based drilling fluid and use thereof. The PASP derivative according to the present disclosure does not contain sulfonated groups and is environmentally-friendly; the PASP derivative could be used as a lubricant for water-based drilling fluids, has excellent lubricating performance, as well as an effect of the stability of wellbore, and is suitable for the drilling exploitation of extended-reach wells.

To achieve the above object of the present disclosure, the present disclosure provides the following technical solutions:

The present disclosure provides a polyaspartic acid (PASP) derivative, having a structure shown in formula I:

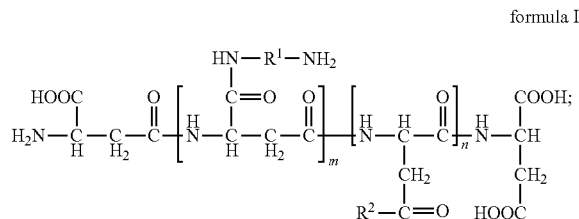

formula I wherein in the formula I, $R_1$ is selected from the group consisting of —$CH_2$—$CH_2$—$CH_2$—, —$CH_2$—$CH_2$—$CH_2$—$CH_2$—, and —$CH_2$—$CH_2$—$CH_2$—$CH_2$—$CH_2$—$CH_2$—;

$R_2$ is selected from the group consisting of —OH, —N($CH_2$—$CH_2$—OH$)_2$, —O—$CH_2$—$CH_2$—NH—$CH_2$—$CH_2$—OH, —NH—$CH_2$—$CH_2$—OH, and —O—$CH_2$—$CH_2$—$NH_2$; and n and m are independently 8 to 17.

In some embodiments, in the formula I, $R^1$ is —$CH_2$—$CH_2$—$CH_2$—, $R^2$ is —OH, and n and m are 12 to 17; or in the formula I, $R^1$ is —$CH_2$—$CH_2$—$CH_2$—$CH_2$—, $R_2$ is —O—$CH_2$—$CH_2$—$NH_2$, and n and m are 8 to 12; or in the formula I, $R^1$ is —$CH_2$—$CH_2$—$CH_2$—$CH_2$—$CH_2$—$CH_2$—, $R^2$ is —O—$CH_2$—$CH_2$—NH—$CH_2$—$CH_2$—OH, and n and m are 10 to 15.

The present disclosure further provides a method for preparing the PASP derivative as described above, comprising:
  mixing aspartic acid with a water-soluble organic amine and conducting polymerization to obtain the PASP derivative, wherein the water-soluble organic amine is one or more selected from the group consisting of 1,2-diaminopropane, 1,4-butanediamine, 1,6-hexanediamine, monoethanolamine, and diethanolamine.

In some embodiments, a mass ratio of aspartic acid to the water-soluble organic amine is in a range of (7-9):(1-3).

In some embodiments, the polymerization is conducted at a temperature of 150° C. to 180° C. for 8 h to 12 h.

The present disclosure further provides use of the PASP derivative as described above or the PASP derivative prepared by the method as described above as a lubricant.

The present disclosure further provides a water-based drilling fluid, comprising water, a pH regulator, a polymer viscosifying and filtration additive, a filtrate reducer, a rheology modifier, a lubricant, and a weighting agent, wherein the lubricant is the PASP derivative as described above or the PASP derivative prepared by the method as described above.

In some embodiments, based on a mass of water, the pH regulator is in an amount of 0.4-0.8% by mass, the polymer viscosifying and filtration additive is in an amount of 0.5-1.5% by mass, the filtrate reducer is in an amount of 2.0-4.0% by mass, the rheology modifier is in an amount of 0.2-0.7% by mass, the lubricant is in an amount of 10.0-30.0% by mass, and the weighting agent is in an amount of 45.0-60.0% by mass.

In some embodiments, the rheology modifier is one or more selected from the group consisting of xanthan gum, tamarind gum, konjac gum, Welan gum, and guar gum.

The present disclosure further provides use of the water-based drilling fluid as described above in the drilling exploitation of an extended-reach well.

The present disclosure provides a PASP derivative. In the present disclosure, the PASP derivative does not contain sulfonated groups and is environmentally-friendly; the PASP derivative could be used as a lubricant for water-based drilling fluids, has excellent lubricating performance, as well as excellent inhibition performance, plugging performance, and stability, and is suitable for the drilling exploitation of extended-reach wells.

The present disclosure further provides a method for preparing the PASP derivative. In the present disclosure, PASP and a water-soluble organic amine are used as raw materials, both of which belong to environmentally-friendly chemicals; the PASP derivative is formed by modifying PASP with the water-soluble organic amine, and could be used as a multifunctional and environmentally-friendly lubricant. In addition, the method for preparing the PASP derivative has simple operation, no need for organic solvents, and environmental friendliness.

DETAILED DESCRIPTION OF THE EMBODIMENTS

The present disclosure provides a polyaspartic acid (PASP) derivative, having a structure shown in formula I:

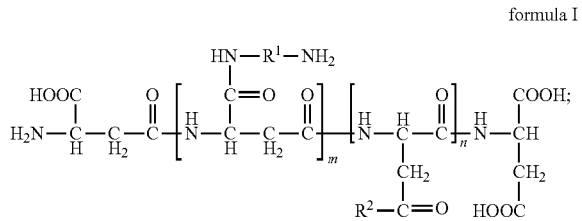

formula I wherein, in the formula I, $R^1$ is selected from the group consisting of —$CH_2$—$CH_2$—$CH_2$—, —$CH_2$—$CH_2$—$CH_2$—$CH_2$—, and —$CH_2$—$CH_2$—$CH_2$—$CH_2$—$CH_2$—$CH_2$—;

$R^2$ is selected from the group consisting of —OH, —N—($CH_2$—$CH_2$—OH)$_2$, —O—$CH_2$—$CH_2$—NH—$CH_2$—$CH_2$—OH, —NH—$CH_2$—$CH_2$—OH, and —O—$CH_2$—$CH_2$—$NH_2$; and n and m are independently 8 to 17.

In the present disclosure, in the formula I, n and m are independently 8 to 17, and the PASP derivative has a corresponding molecular weight of 2,000 to 4,000; specifically, in some embodiments, n=m, and n is 8 to 12, 10 to 15, or 12 to 17.

In some embodiments of the present disclosure, in the formula I, $R^1$ is —$CH_2$—$CH_2$—$CH_2$—, $R^2$ is —OH, and n=m=12 to 17; or in the formula I, $R^1$ is —$CH_2$—$CH_2$—$CH_2$—$CH_2$—, $R^2$ is —O—$CH_2$—$CH_2$—$NH_2$, and n=m=8 to 12; or in the formula I, $R^1$ is —$CH_2$—$CH_2$—$CH_2$—$CH_2$—$CH_2$—$CH_2$—, $R^2$ is —O—$CH_2$—$CH_2$—NH—$CH_2$—$CH_2$—OH, and n=m=10 to 15.

The present disclosure further provides a method for preparing the PASP derivative as described above, comprising:

mixing aspartic acid with a water-soluble organic amine and conducting polymerization to obtain the PASP derivative, wherein the water-soluble organic amine is one or more selected from the group consisting of 1,2-diaminopropane, 1,4-butanediamine, 1,6-hexanediamine, monoethanolamine, and diethanolamine.

In the present disclosure, unless otherwise specified, all the raw materials are commercially available products well known to persons skilled in the art.

In the present disclosure, the water-soluble organic amine is one or more selected from the group consisting of 1,2-diaminopropane, 1,4-butanediamine, 1,6-hexanediamine, monoethanolamine, and diethanolamine, preferably 1,2-diaminopropane, a 1,4-butanediamine-monoethanolamine mixture, or a 1,6-hexanediamine-diethanolamine mixture. In some embodiments, in the 1,4-butanediamine-monoethanolamine mixture, a mass ratio of 1,4-butanediamine to monoethanolamine is in a range of (5-8):(2-5), preferably 7:3. In some embodiments, in the 1,6-hexanediamine-diethanolamine mixture, a mass ratio of 1,6-hexanediamine to diethanolamine is in a range of (3-5):(5-7), preferably 4:6.

In the present disclosure, in some embodiments, a mass ratio of aspartic acid to the water-soluble organic amine is in a range of (7-9):(1-3), specifically 7:3, 8:2, or 9:1. In the present disclosure, in some embodiments, the polymerization is conducted at a temperature of 150° C. to 180° C., specifically 150° C., 160° C., or 180° C. In some embodiments, the polymerization is conducted for 8 h to 12 h, specifically 8 h, 10 h, or 12 h. In some embodiments, the polymerization is conducted under stirring. In the present disclosure, after the polymerization, no post-treatment is required to obtain the PASP derivative with a structure shown in formula I, which is a brown substance.

In the present disclosure, by modifying PASP with the water-soluble organic amine, the water solubility can be improved, the molecular weight can be increased, and the compatibility with the drilling fluid can be improved. The resulting PASP derivative contains a large number of amide groups, ester groups, carboxyl groups, and amine groups, wherein N and O atoms contain lone pair electrons; the amine groups are protonated when encountering water in the drilling fluid, so that the PASP derivative is firmly adsorbed on the surface of clay and metal, forming a non-polar oil film, playing a lubricating role, and improving the inhibition performance of the drilling fluid system. In addition, the molecular chain of the PASP derivative can be stretched in water to form a spatial network structure; under the action of intermolecular force and static electricity, the structure can adsorb the surface of the clay to form a dense adsorption film, preventing the transmission of formation pressure, and playing a plugging role.

The present disclosure further provides use of the PASP derivative as described above or the PASP derivative prepared by the method as described above as a lubricant.

The present disclosure further provides a water-based drilling fluid, comprising water, a pH regulator, a polymer viscosifying and filtration additive, a filtrate reducer, a rheology modifier, a lubricant, and a weighting agent, wherein the lubricant is the PASP derivative as described above or the PASP derivative prepared by the method as described above. In the present disclosure, in some embodiments, based on a mass of water, the pH regulator is in an amount of 0.4-0.8% by mass, the polymer viscosifying and filtration additive is in an amount of 0.5-1.5% by mass, the filtrate reducer is in an amount of 2.0-4.0% by mass, the rheology modifier is in an amount of 0.2-0.7% by mass, the lubricant is in an amount of 10.0-30.0% by mass, and the weighting agent is in an amount of 45.0-60.0% by mass. The present disclosure will be specifically described below.

In the present disclosure, in some embodiments, the water is fresh water or sea water.

In the present disclosure, in some embodiments, the pH regulator accounts for 0.4-0.8% of the mass of water, specifically 0.4%, 0.6%, or 0.8%. In the present disclosure, in some embodiments, the pH regulator is one or more selected from the group consisting of sodium hydroxide, sodium carbonate, and potassium hydroxide, preferably a sodium hydroxide-sodium carbonate mixture. In some embodiments, in the sodium hydroxide-sodium carbonate mixture, a mass ratio of sodium hydroxide to sodium carbonate is in a range of (2-4):(6-8), specifically 2:8, 3:7, or 4:6. In the present disclosure, in some embodiments, the amount of the pH regulator is limited to the above range, and the resulting water-based drilling fluid has a pH value of 9 to 11, specifically 9, 10, or 11.

In the present disclosure, in some embodiments, the polymer viscosifying and filtration additive accounts for 0.5-1.5% of the mass of water, specifically 0.5%, 1.0%, or 1.5%. In the present disclosure, in some embodiments, the polymer viscosifying and filtration additive is one or more selected from the group consisting of polyacrylamide potassium salt, polyacrylamide sodium salt, and polyanionic cellulose, preferably polyacrylamide sodium salt. In some embodiments, polyacrylamide sodium salt has a relative molecular mass of 1 million to 1.2 million. In the present disclosure, in some embodiments, polyacrylamide sodium salt is used as the polymer viscosifying and filtration additive; polyacrylamide sodium salt has desirable temperature and salt resistances, and has excellent compatibility with other treatment agents.

In the present disclosure, the filtrate reducer accounts for 2.0-4.0% of the mass of water, specifically 2.0%, 3.0%, or 4.0%. In the present disclosure, in some embodiments, the filtrate reducer is one or more selected from the group consisting of sulfomethyl phenolic resin (SMP-II), sulfomethyl lignite resin (SPNH), hydroxypropyl starch (HPS), and carboxymethyl starch (CMS), preferably carboxymethyl starch (CMS). In the present disclosure, in some embodiments, the CMS is used as the filtrate reducer, is environmentally-friendly, has a mature preparation process, and is easy to obtain.

In the present disclosure, the rheology modifier accounts for 0.2-0.7% of the mass of water, specifically 0.2%, 0.3%, 0.5%, or 0.7%. In the present disclosure, in some embodiments, the rheology modifier is one or more selected from the group consisting of xanthan gum, tamarind gum, konjac gum, Welan gum, and guar gum, preferably a xanthan gum-Welan gum mixture. In some embodiments, in the xanthan gum-Welan gum mixture, a mass ratio of xanthan gum to Welan gum is in a range of (3-5):(5-7), specifically 3:7, 4:6, or 5:5. In the present disclosure, Welan gum has desirable temperature resistance, and could be combined with xanthan gum to exert a synergistic effect, improving the temperature resistance of the rheology modifier.

In the present disclosure, the lubricant accounts for 10.0-30.0% of the mass of water, specifically 10.0%, 20.0%, or 30.0%. In the present disclosure, in some embodiments, the PASP derivative could be used as the lubricant for the water-based drilling fluids, has desirable lubricating performance, as well as excellent inhibition performance, plugging performance, and stability, is suitable for the drilling exploitation of extended-reach wells, and is environmentally-friendly.

In the present disclosure, the weighting agent accounts for 45.0-60.0% of the mass of water. In the present disclosure, in some embodiments, the weighting agent is a barite. In the present disclosure, in some embodiments, the amount of the weighting agent is limited to the above range, and the resulting water-based drilling fluid has a density of 1.3 $g/cm^3$ to 1.4 $g/cm^3$.

The present disclosure further provides use of the water-based drilling fluid as described above in the drilling exploitation of an extended-reach well. In the present disclosure, the extended-reach well specifically refers to a well with a water vertical ratio of not less than 2 and a measured depth of greater than 3,000 m, or a well with a horizontal displacement of greater than 3,000 m.

The technical solutions of the present disclosure will be clearly and completely described below with reference to the examples of the present disclosure. It is obvious that the described examples are only part of the examples of the present disclosure, not all of them. All other examples made by those of ordinary skill in the art based on the examples of the present disclosure without creative efforts should fall within the protection scope of the present disclosure.

Example 1

A three-necked round-bottomed flask equipped with a stirrer, a reflux condenser, and a thermometer was set up. In parts by weight, 80 parts of aspartic acid and 20 parts of 1,2-diaminopropane were added into the three-necked round-bottomed flask heated to 160° C. under stirring and then reacted at such temperature for 10 h, obtaining a lubricant (denoted as RH-1; wherein $R^1$ was —$CH_2$—$CH_2$—$CH_2$—, $R^2$ was —OH, and n=m=12 to 17).

In order to conduct subsequent performance tests to evaluate the lubricating performance of the lubricant in fresh water, in parts by weight, 90 parts of fresh water and 10 parts of the lubricant (RH-1) were mixed, obtaining a water-based drilling fluid.

Example 2

A three-necked round-bottomed flask equipped with a stirrer, a reflux condenser, and a thermometer was set up. In parts by weight, 90 parts of aspartic acid and 10 parts of an water-soluble organic amine (specifically, 1,4-butanediamine and monoethanolamine, wherein a mass ratio of 1,4-butanediamine to monoethanolamine was 7:3) were added into the three-necked round-bottomed flask, heated to 150° C. under stirring and then reacted at such temperature for 12 h, obtaining a lubricant (denoted as RH-2; wherein $R^1$ was —$CH_2$—$CH_2$—$CH_2$—$CH_2$—, $R^2$ was —O—$CH_2$—$CH_2$—$NH_2$, and n=m=8 to 12).

In order to conduct subsequent performance tests to evaluate the lubricating performance of the lubricant in fresh water, in parts by weight, 80 parts of fresh water and 20 parts of the lubricant (RH-2) were mixed, obtaining a water-based drilling fluid.

Example 3

A three-necked round-bottomed flask equipped with a stirrer, a reflux condenser, and a thermometer was set up. In parts by weight, 70 parts of aspartic acid and 30 parts of a water-soluble organic amine (specifically, 1,6-hexanediamine and diethanolamine, wherein a mass ratio of 1,6-hexanediamine to diethanolamine was 4:6) were added into the three-necked round-bottomed flask heated to 180° C. under stirring and then reacted at such temperature for 8 h, obtaining a lubricant (denoted as RH-3; wherein $R^1$ was —$CH_2$—$CH_2$—$CH_2$—$CH_2$—$CH_2$—$CH_2$—, $R^2$ was —O—$CH_2$—$CH_2$—NH—$CH_2$—$CH_2$—OH, and n=m=10 to 15).

In order to conduct subsequent performance tests to evaluate the lubricating performance of the lubricant in fresh water, in parts by weight, 70 parts of fresh water and 30 parts of the lubricant (RH-3) were mixed, obtaining a water-based drilling fluid.

Example 4

In this example, a water-based drilling fluid consisted of water, a pH regulator, a polymer viscosifying and filtration additive, a filtrate reducer, a rheology modifier, a lubricant, and a weighting agent.

Base on the mass of water, an amount of the pH regulator was 0.8% by mass, an amount of the polymer viscosifying and filtration additive was 1.5% by mass, an amount of the filtrate reducer was 3.0% by mass, an amount of the rheology modifier was 0.5% by mass, an amount of the lubricant was 10.0% by mass, and an amount of the weighting agent was 45.0% by mass.

Wherein, the water was fresh water; the pH regulator was sodium hydroxide and sodium carbonate, and a mass ratio of sodium hydroxide to sodium carbonate was 2:8; the polymer-based and viscosity-increasing filtrate reducer was polyacrylamide sodium salt, with a relative molecular weight of 1 million to 1.2 million; the filtrate reducer was carboxymethyl starch (CMS); the rheology modifier was xanthan gum and Welan gum, and a mass ratio of xanthan gum to Welan gum was 3:7; the lubricant was the RH-1 prepared in Example 1; and the weighting agent was barite (a commercially-available commodity).

The water-based drilling fluid had a density of 1.3 g/cm³ and a pH value of 11.

Example 5

In this example, a water-based drilling fluid consisted of water, a pH regulator, a polymer viscosifying and filtration additive, a filtrate reducer, a rheology modifier, a lubricant, and a weighting agent.

Base on the mass of water, an amount of the pH regulator was 0.6% by mass, an amount of the polymer viscosifying and filtration additive was 1.0% by mass, an amount of the filtrate reducer was 2.0% by mass, an amount of the rheology modifier was 0.2% by mass, an amount of the lubricant was 20.0% by mass, and an amount of the weighting agent was 45.0% by mass.

Wherein, the water was sea water; the pH regulator was sodium hydroxide and sodium carbonate, and a mass ratio of sodium hydroxide to sodium carbonate was 4:6; the polymer viscosifying and filtration additive was polyacrylamide sodium salt, with a relative molecular weight of 1 million to 1.2 million; the filtrate reducer was carboxymethyl starch (CMS); the rheology modifier was xanthan gum and Welan gum, and a mass ratio of xanthan gum to Welan gum was 5:5; the lubricant was the RH-2 prepared in Example 2; and the weighting agent was barite (a commercially-available commodity).

The water-based drilling fluid had a density of 1.3 g/cm³ and a pH value of 10.

Example 6

In this example, a water-based drilling fluid consisted of water, a pH regulator, a polymer viscosifying and filtration additive, a filtrate reducer, a rheology modifier, a lubricant, and a weighting agent.

Base on the mass of water, an amount of the pH regulator was 0.4% by mass, an amount of the polymer viscosifying and filtration additive was 0.5% by mass, an amount of the filtrate reducer was 4.0% by mass, an amount of the rheology modifier was 0.3% by mass, an amount of the lubricant was 30.0% by mass, and an amount of the weighting agent was 45.0% by mass.

Wherein, the water was sea water; the pH regulator was sodium hydroxide and sodium carbonate, and a mass ratio of sodium hydroxide to sodium carbonate was 3:7; the polymer viscosifying and filtration additive was polyacrylamide sodium salt, with a relative molecular weight of 1 million to 1.2 million; the filtrate reducer was carboxymethyl starch (CMS); the rheology modifier was xanthan gum and Welan gum, and a mass ratio of xanthan gum to Welan gum was 4:6; the lubricant was the RH-3 prepared in Example 3; and the weighting agent was barite (a commercially-available commodity).

The water-based drilling fluid had a density of 1.3 g/cm³ and a pH value of 9.

Example 7

In this example, a water-based drilling fluid consisted of water, a pH regulator, a polymer viscosifying and filtration additive, a filtrate reducer, a rheology modifier, a lubricant, and a weighting agent.

Base on the mass of water, an amount of the pH regulator was 0.6% by mass, an amount of the polymer viscosifying and filtration additive was 1.0% by mass, an amount of the filtrate reducer was 2.0% by mass, an amount of the rheology modifier was 0.7% by mass, an amount of the lubricant was 30.0% by mass, and an amount of the weighting agent was 60.0% by mass.

Wherein, the water was fresh water; the pH regulator was sodium hydroxide and sodium carbonate, and a mass ratio of sodium hydroxide to sodium carbonate was 4:6; the polymer viscosifying and filtration additive was polyacrylamide sodium salt, with a relative molecular weight of 1 million to 1.2 million; the filtrate reducer was carboxymethyl starch (CMS); the rheology modifier was xanthan gum and Welan gum, and a mass ratio of xanthan gum to Welan gum was 5:5; the lubricant was the RH-3 prepared in Example 3; and the weighting agent was barite (a commercially-available commodity).

The water-based drilling fluid had a density of 1.4g/cm³ and a pH value of 10.

Comparative Example 1

100 parts by mass of white oil was used.

Comparative Example 2

100 parts by mass of polymeric alcohol was used.

Comparative Example 3

In parts by mass, 100 parts of sea water, 2.5 parts of sodium bentonite, 0.25 parts of NaOH, 0.25 parts of $Na_2CO_3$, 3 parts of sulfonated-pheno-formoldehyde resin, 3 parts of potassium humate, 5.0 parts of KCl, 2.0 parts of NaCl, 2.0 parts of polyamine inhibitor, 2.0 parts of a lubricant (methyl oleate), and barite were fully mixed, obtaining a water-based drilling fluid with a density of 1.4 g/cm³.

Comparative Example 4

In parts by mass, 85 parts of 0# diesel, 15 parts of a saturated calcium chloride aqueous solution, 2.5 parts of organic soil, 4.0 parts of a primary emulsifier, 1.0 part of an auxiliary emulsifier, 0.5 part of an extractant, 2.0 parts of an alkalinity regulator, 2.5 parts of a filtrate reducer, 2.5 parts of a plugging agent, and 100 parts of barite were fully mixed, obtaining an oil-based drilling fluid with a density of 1.4 g/cm³.

Test Example 1

The biotoxicity of lubricants was tested according to GB/T 18420.2-2009 (Test method for Biological toxicity for pollutants from marine petroleum exploration and exploitation). The degradation performance of lubricants was analyzed according to SY/T 6788-2020 (Evaluation procedures of environmental protection for water-soluble oilfield chemicals). The specific results are shown in Table 1.

TABLE 1

Evaluation results of the environmental performance of lubricants

| Lubricant | LC50 (mg/L) | $BOD_5/COD_{Cr}$ (%) |
|---|---|---|
| RH-1 | 86968 | 35.0 |
| RH-2 | 78329 | 32.2 |
| RH-3 | 80356 | 28.9 |

Notes: The addition amounts of the lubricants were 20%; LC50 is the half-death concentration of Artemia (mg/L); $COD_{Cr}$ is chemical oxygen demand (mg/L); BOD5 is biochemical oxygen demand (mg/L).

It can be seen from Table 1 that the lubricants prepared in the examples of the present disclosure have LC50 of greater than 30,000 mg/L and $BOD_5/COD_{Cr}$ values of greater than 25%, which indicates that the lubricants are environmentally-friendly.

Test Example 2

The lubricating performance and anti-wear performance of the drilling fluids in Examples 1 to 7 and Comparative Examples 1 to 4 were tested, respectively. In which, an EP extreme pressure lubricator was used to measure the lubrication coefficient of the drilling fluids under a pressure of 150 PSI (specifically referring to the evaluation method of reduction rate of the lubrication coefficient in SY/T 6094-1994 "Evaluation Procedure for Lubricants for Drilling Fluids" to calculate the lubrication coefficient). A KMY201-1A anti-wear tester was used to measure the anti-wear performance of the drilling fluids. The specific results are shown in Table 2.

TABLE 2

Test results of the lubrication performance and abrasion resistance of drilling fluids

| Drilling fluid source | M | KM |
|---|---|---|
| Example 1 | 0.086 | 8 |
| Example 2 | 0.048 | 10 |
| Example 3 | 0.031 | 10 |
| Example 4 | 0.091 | 9 |
| Example 5 | 0.087 | 10 |
| Example 6 | 0.063 | 10 |
| Example 7 | 0.068 | 10 |
| Comparative Example 1 | 0.036 | 5 |
| Comparative Example 2 | 0.035 | 7 |
| Comparative Example 3 | 0.120 | 8 |
| Comparative Example 4 | 0.073 | 9 |

Notes: M is the lubrication coefficient (dimensionless) of drilling fluid; and KM is the anti-wear performance of drilling fluid (block).

It can be seen from Table 2 that with the increase of the content of the lubricants prepared in the examples of the present disclosure, the drilling fluid lubrication coefficient of the drilling fluid decreases significantly, and the anti-wear performance improves. The lubricating performance and anti-wear performance of the drilling fluid containing 30% lubricant are better than those of 100% white oil and 100% polymeric alcohol. In addition, the lubricating and anti-wear performances of the water-based drilling fluids prepared by the lubricants prepared in the examples of the present disclosure are far superior to those of conventional water-based drilling fluids, and had similar lubricating and anti-wear performances to those of oil-based drilling fluids, which indicates that the lubricants provided by the present disclosure have excellent lubricating performance.

Test Example 3

According to the standard GB/T 16783.1-2014 (Petroleum and natural gas industries—Field testing of drilling fluids—Part 1: Water-based fluids), the rheological performance and plugging performance of the drilling fluids in Examples 4 to 7 and Comparative Example 3 after hot rolling were evaluated. According to the standard GB/T 16783.2-2012 (Petroleum and natural gas industries—Field testing of drilling fluids—Part 2: Oil-based fluids), the rheological performance and plugging performance of the drilling fluid in Comparative Example 4 after hot rolling were tested. The specific results are shown in Table 3.

TABLE 3

Evaluation results of the performance test of drilling fluids

| Drilling fluid source | PV | YP | Φ3 | PPT | G |
|---|---|---|---|---|---|
| Example 4 | 28 | 10 | 9 | 6.4 | 90.20 |
| Example 5 | 34 | 11 | 11 | 4.2 | 93.19 |

TABLE 3-continued

Evaluation results of the performance test of drilling fluids

| Drilling fluid source | PV | YP | Φ3 | PPT | G |
|---|---|---|---|---|---|
| Example 6 | 38 | 13 | 12 | 3.0 | 94.23 |
| Example 7 | 40 | 14 | 13 | 3.2 | 95.78 |
| Comparative Example 3 | 36 | 10 | 10 | 5.8 | 84.12 |
| Comparative Example 4 | 33 | 8 | 7 | 4.7 | 93.86 |

Notes: Hot rolling condition was 120° C.×16 h; PV is the plastic viscosity of drilling fluid (mPa·s); YP is the dynamic shearing force of drilling fluid (Pa); Φ3 is the 3-turn reading of a six-speed rotary viscometer (dimensionless); PPT is plugging fluid loss (mL), specifically refers to the fluid loss volume under the conditions of 3.5 MPa, 120° C., and 30 min using a sand table instead of filter paper; G is the rolling recovery rate of outcrop soil in drilling fluid (%).

It can be seen from Table 3 that the water-based drilling fluids provided by the present disclosure exhibit desirable rheological performance, inhibition performance, and low filtration performance after hot rolling at 120° C. for 16 h. The increase of lubricant content in the water-based drilling fluid is helpful to improve the plugging performance and inhibition performance of the water-based drilling fluids, which indicates that the PASP derivative provided by the present disclosure, as a lubricant, can improve the inhibition performance and plugging performance of the water-based drilling fluids to a certain extent.

The above descriptions are merely the preferred embodiments of the present disclosure. It should be understood that for those skilled in the art, several improvements and modifications could be further made without departing from the principle of the present disclosure, and these improvements and modifications should be deemed as falling within the protection scope of the present disclosure.

What is claimed is:

1. A polyaspartic acid derivative, having a structure shown in formula I:

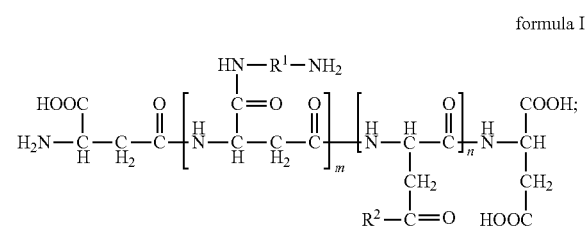

formula I wherein, in the formula I,
$R^1$ is selected from the group consisting of —$CH_2$—$CH_2$—$CH_2$—, —$CH_2$—$CH_2$—$CH_2$—$CH_2$—, and —$CH_2$—$CH_2$—$CH_2$—$CH_2$—$CH_2$—$CH_2$—;
$R^2$ is selected from the group consisting of —OH, —N—($CH_2$—$CH_2$—OH)$_2$, —O—$CH_2$—$CH_2$—NH—$CH_2$—$CH_2$—OH, —NH—$CH_2$—$CH_2$—OH, and —O—$CH_2$—$CH_2$—$NH_2$; and
n and m are independently 8 to 17.

2. The polyaspartic acid derivative of claim 1, wherein in the formula I, $R^1$ is —$CH_2$—$CH_2$—$CH_2$—, $R^2$ is —OH, and n and m are 12 to 17; or
in the formula I, $R^1$ is —$CH_2$—$CH_2$—$CH_2$—$CH_2$—, $R^2$ is —O—$CH_2$—$CH_2$—$NH_2$, and n and m are 8 to 12; or
in the formula I, $R^1$ is —$CH_2$—$CH_2$—$CH_2$—$CH_2$—$CH_2$—$CH_2$—, $R^2$ is —O—$CH_2$—$CH_2$—NH—$CH_2$—$CH_2$—OH, and n and m are 10 to 15.

3. A method for preparing the polyaspartic acid derivative of claim 1, comprising:
mixing aspartic acid with a water-soluble organic amine and conducting polymerization to obtain the polyaspartic acid derivative, wherein the water-soluble organic amine is one or more selected from the group consisting of 1,2-diaminopropane, 1,4-butanediamine, 1,6-hexanediamine, monoethanolamine, and diethanolamine.

4. The method of claim 3, wherein a mass ratio of aspartic acid to the water-soluble organic amine is in a range of (7-9):(1-3).

5. The method of claim 3, wherein the polymerization is conducted at a temperature of 150° C. to 180° C. for 8 h to 12 h.

6. A lubricant, comprising the polyaspartic acid derivative of claim 1.

7. A water-based drilling fluid, comprising water, a pH regulator, a polymer viscosifying and filtration additive, a filtrate reducer, a rheology modifier, a lubricant, and a weighting agent, wherein the lubricant is the polyaspartic acid derivative of claim 1.

8. The water-based drilling fluid of claim 7, wherein based on a mass of water, the pH regulator is in an amount of 0.4-0.8% by mass, the polymer viscosifying and filtration additive is in an amount of 0.5-1.5% by mass, the filtrate reducer is in an amount of 2.0-4.0% by mass, the rheology modifier is in an amount of 0.2-0.7% by mass, the lubricant is in an amount of 10.0-30.0% by mass, and the weighting agent is in an amount of 45.0-60.0% by mass.

9. The water-based drilling fluid of claim 7, wherein the rheology modifier is one or more selected from the group consisting of xanthan gum, tamarind gum, konjac gum, Welan gum, and guar gum.

10. A method for the drilling exploitation of an extended-reach well, comprising using the water-based drilling fluid of claim 7.

11. The method of claim 3, wherein in the formula I, $R^1$ is —$CH_2$—$CH_2$—$CH_2$—, $R^2$ is —OH, and n and m are 12 to 17; or
in the formula I, $R^1$ is —$CH_2$—$CH_2$—$CH_2$—$CH_2$—, $R^2$ is —O—$CH_2$—$CH_2$—$NH_2$, and n and m are 8 to 12; or
in the formula I, $R^1$ is —$CH_2$—$CH_2$—$CH_2$—$CH_2$—$CH_2$—$CH_2$—, $R^2$ is —O—$CH_2$—$CH_2$—NH—$CH_2$—$CH_2$—OH, and n and m are 10 to 15.

12. The lubricant of claim 6, wherein in the formula I, $R^1$ is —$CH_2$—$CH_2$—$CH_2$—, $R^2$ is —OH, and n and m are 12 to 17; or
in the formula I, $R^1$ is —$CH_2$—$CH_2$—$CH_2$—$CH_2$—, $R^2$ is —O—$CH_2$—$CH_2$—$NH_2$, and n and m are 8 to 12; or
in the formula I, $R^1$ is —$CH_2$—$CH_2$—$CH_2$—$CH_2$—$CH_2$—$CH_2$—, $R^2$ is —O—$CH_2$—$CH_2$—NH—$CH_2$—$CH_2$—OH, and n and m are 10 to 15.

13. The water-based drilling fluid of claim 7, wherein in the formula I, $R^1$ is —$CH_2$—$CH_2$—$CH_2$—, $R^2$ is —OH, and n and m are 12 to 17; or
in the formula I, $R^1$ is —$CH_2$—$CH_2$—$CH_2$—$CH_2$—, $R^2$ is —O—$CH_2$—$CH_2$—$NH_2$, and n and m are 8 to 12; or
in the formula I, $R^1$ is —$CH_2$—$CH_2$—$CH_2$—$CH_2$—$CH_2$—$CH_2$—, $R^2$ is —O—$CH_2$—$CH_2$—NH—$CH_2$—$CH_2$—OH, and n and m are 10 to 15.

14. The water-based drilling fluid of claim 9, wherein based on a mass of water, the pH regulator is in an amount of 0.4-0.8% by mass, the polymer viscosifying and filtration additive is in an amount of 0.5-1.5% by mass, the filtrate reducer is in an amount of 2.0-4.0% by mass, the rheology modifier is in an amount of 0.2-0.7% by mass, the lubricant is in an amount of 10.0-30.0% by mass, and the weighting agent is in an amount of 45.0-60.0% by mass.

15. The method of claim 10, wherein based on a mass of water, the pH regulator is in an amount of 0.4-0.8% by mass, the polymer viscosifying and filtration additive is in an amount of 0.5-1.5% by mass, the filtrate reducer is in an amount of 2.0-4.0% by mass, the rheology modifier is in an amount of 0.2-0.7% by mass, the lubricant is in an amount of 10.0-30.0% by mass, and the weighting agent is in an amount of 45.0-60.0% by mass.

16. The method of claim 10, wherein the rheology modifier is one or more selected from the group consisting of xanthan gum, tamarind gum, konjac gum, Welan gum, and guar gum.

* * * * *